United States Patent [19]

Nakajima

[11] Patent Number: 4,618,107
[45] Date of Patent: Oct. 21, 1986

[54] FISHING REEL
[75] Inventor: Hideki Nakajima, Sakai, Japan
[73] Assignee: Shimano Industrial Company Limited, Osaka, Japan
[21] Appl. No.: 328,691
[22] Filed: Dec. 8, 1981
[30] Foreign Application Priority Data Dec. 16, 1980 [JP] Japan .................. 55-181277[U]
Dec. 16, 1980 [JP] Japan .................. 55-181278[U]

[51] Int. Cl.$^4$ .................................... H01K 89/01
[52] U.S. Cl. ................................... 242/84.21 R
[58] Field of Search ............... 242/84.21 A, 84.26
[56] References Cited

U.S. PATENT DOCUMENTS

| 2,834,559 | 5/1958 | Nagy | 242/84.21 R |
| 3,967,791 | 7/1976 | Morishita | 242/84.21 R |
| 4,279,387 | 7/1981 | Morimoto | 242/84.2 G |

FOREIGN PATENT DOCUMENTS

| 67823 | 6/1940 | Czechoslovakia | 242/84.21 R |
| 3014642 | 10/1980 | Fed. Rep. of Germany . | |
| 237738 | 9/1945 | Switzerland | 242/84.21 R |
| 603605 | 6/1948 | United Kingdom | 242/84.21 R |
| 882777 | 11/1961 | United Kingdom . | |
| 1582263 | 1/1981 | United Kingdom . | |

Primary Examiner—Billy S. Taylor
Attorney, Agent, or Firm—Stevens, Davis, Miller & Mosher

[57] ABSTRACT

A winding and reciprocation mechanism is disclosed for a spinning type fishing reel. A master gear is connected to and rotates a first tubular shaft which is connected to a rotary frame. The master gear is also connected to and rotates a second tubular shaft disposed within the first tubular shaft. The second tubular shaft is connected with an axially fixed engaging member which engages with a transverse groove in a spool shaft to axially reciprocate the spool shaft and in turn a spool connected thereto. The engaging member is incorporated in an inner space of the rotary frame to provide a small lightweight reel.

7 Claims, 3 Drawing Figures

FISHING REEL

FIELD OF THE INVENTION

This invention relates to a fishing reel, and more particularly to a fishing reel which is provided with a spool shaft having a spool and which is supported to a reel body in relation of being movable in reciprocation longitudinally thereof, and with a rotary frame having a bail arm and which is supported rotatably to the reel body, so that the rotary frame rotates while the spool shaft is moving longitudinally of the reel body to wind a fishing line onto the spool.

BACKGROUND OF THE INVENTION

Conventionally, a fishing reel which winds the fishing line onto the spool as abovementioned, is called a spinning reel and is well-known.

The spinning reel has a box-like shaped reel body comprising a front wall and side walls. A tubular shaft and the spool shaft are insertably supported through a through bore provided at the front wall and project outwardly therefrom, the tubular shaft carrying at its axial end the rotary frame, the spool shaft carrying at its axial end the spool. A handle shaft having a handle is supported to the side walls at a right angle with the tubular shaft and spool shaft. The reel body houses therein a transmission mechanism for transmitting rotation of the handle to the rotary frame through the tubular shaft.

The transmission mechanism comprises a master gear supported onto the handle shaft and a pinion on the tubular shaft, so that the pinion engages with the master gear to increase rotational speed of the handle and transmit it to the rotary frame.

In order to reciprocate the spool shaft longitudinally of the reel body simultaneously with the rotation of rotary frame, a reciprocation mechanism is provided within the reel body. The reciprocation mechanism comprises a traverse groove provided at the outer periphery of a portion of the spool shaft within the reel body and an engaging member provided at a portion of the tubular shaft within the same, the engaging member engaging with the traverse groove to allow the spool shaft to reciprocate longitudinally of the reel body following the rotation of tubular shaft.

The reciprocation mechanism and transmission mechanism are housed within the reel body and occupy therein a space for both mechanisms, thereby making the reel body large-sized, larger in weight, and expensive to produce.

The reciprocation mechanism can reciprocate the spool shaft more smoothly than a mechanism using a link which is pin-connected eccentrically to the master gear, but is so constructed that the master gear once rotates to allow the spool shaft to once reciprocate, which causes synchronization of rotation of the rotary frame with reciprocal movement of the spool shaft. As a result, the rotation of rotary frame leads to a limit in a line-winding position on the spool, which will create the problem that the line cannot be wound uniformly throughout an axial length of a trunk of the spool.

SUMMARY OF THE INVENTION

A main object of the invention is to provide a fishing reel which can solve the above problem in a fishing reel having a reciprocation mechanism comprising a traverse groove and engaging member engageable therewith and which is small-sized, lightweight, and inexpensive to produce. Another object of the invention is to provide a fishing reel by which the fishing line can be wound uniformly onto the spool.

This invention has been designed to utilize the dead space within the rotary frame in front of the front wall at the reel body in which the reciprocation mechanism, is assembled, thereby making the reel body small-sized.

In detail, the rotary frame at the fishing reel of the invention comprises a support plate supported to the tubular shaft, a cylindrical body, and a pair of support arms carrying the bail arm. The spool comprises a cylindrical trunk and a pair of flanges. In a typical construction, the trunk of the spool has an inner diameter larger than an outer diameter of the cylindrical body at the rotary frame and is sleeved onto the cylindrical body, thereby positively forming a space therein. Thus, the engaging member at the reciprocation mechanism can be disposed within the space. Hence, the reciprocation mechanism need not be assembled into the reel body as conventional, so that the reel body can be small-sized to that extent so as to be lightweight and inexpensive to produce.

The engaging member at the reciprocation mechanism may be supported to the axial end of a tubular shaft projecting outwardly from the front wall of the reel body and move may in association with the tubular shaft, but it is preferable that the engaging member moves in association with an association shaft provided separately from the tubular shaft.

In this instance, a master gear at the transmission mechanism is provided with second transmitting teeth separate and different in diameter from first transmitting teeth engageable with a first pinion at the tubular shaft, and the association shaft is provided with a second pinion engageable with the second transmitting teeth, thereby changing rotational speed of the association shaft with respect to that of the tubular shaft. Hence, the line can be wound uniformly onto the spool because the spool moves longitudinally of the reel body independently of rotation of the rotary frame and without synchronization therewith.

These and other objects of the invention will become more apparent in the detailed description and examples which follow.

DETAILED DESCRIPTION OF THE INVENTION

Figure 1:
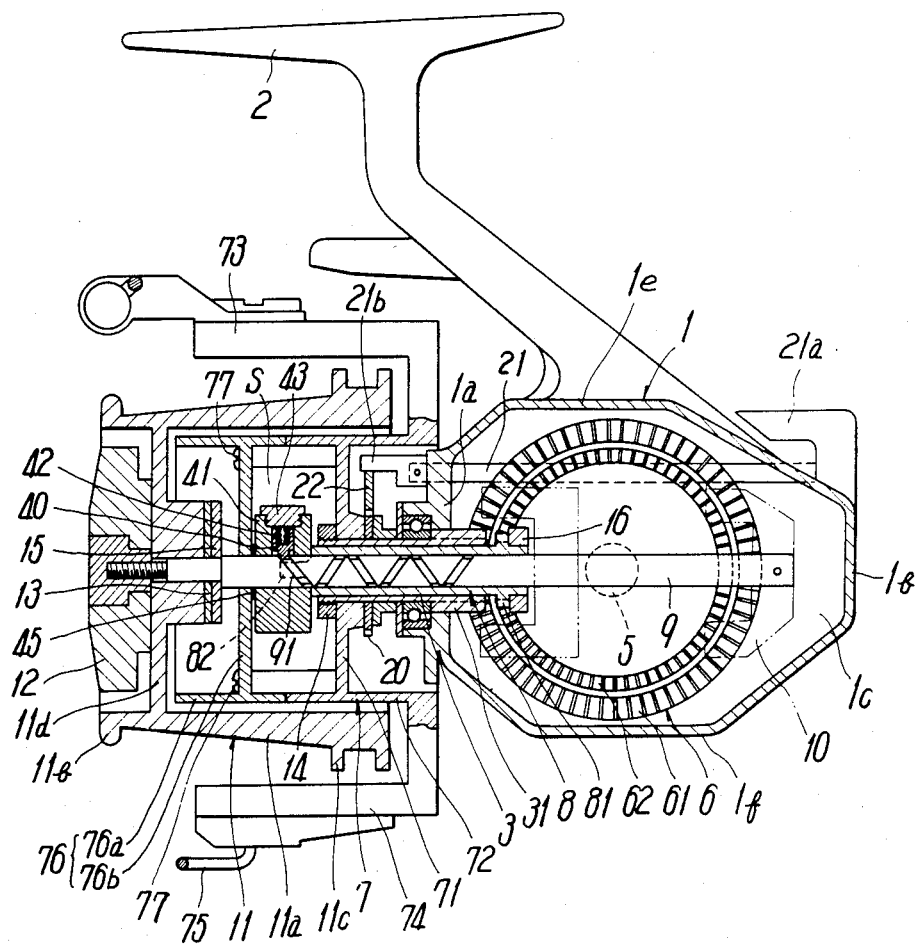
FIG. 1 is a longitudinally sectional side view of an embodiment of a fishing reel of the invention.
Figure 2:
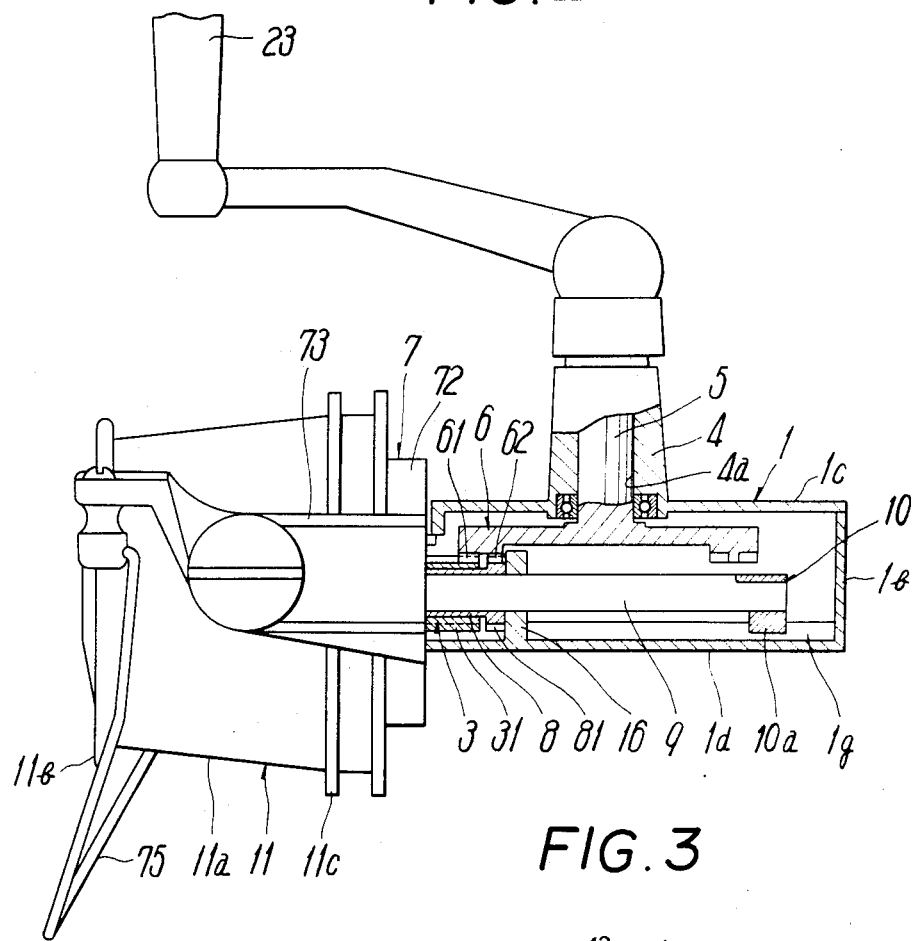
FIG. 2 is a partially cutaway plan view of the FIG. 1 embodiment.

A typical fishing reel of the invention is shown in FIGS. 1 and 2, in which a reel body 1 is box-liked shaped and has a front wall 1a, a rear wall 1b, a pair of side walls 1c and 1d, an upper wall 1e, and a lower wall 1f. The upper wall 1e is provided with a mounting leg 2 for a fishing rod (not shown), the front wall 1a having one through bore through which a tubular shaft 3 is rotatably supported, the side wall 1c being provided with a bearing cylinder 4 having a shaft bore 4a at a right angle with the axis of tubular shaft 3, the bearing cylinder 4 rotatably supporting a handle shaft 5 having a master gear 6.

The tubular shaft 3 enters at one axial end thereof into the reel body 1 and projects at the other axial end outwardly from the front wall 1a. At the one axial end is provided a first pinion 31 engageable with first transmitting teeth 61 provided at one side of the peripheral portion of master gear 6, and at the other axial end is fixedly supported a rotary frame 7.

The fishing reel shown in FIGS. 1 and 2 has an association shaft 8 separate from the tubular shaft 3, which shaft 8 operates a reciprocation mechanism for reciprocating a spool to be hereinafter described. The association shaft 8 is hollow and larger in length than the tubular shaft 3, and is inserted rotatably into the tubular shaft 3. A spool shaft 9 is insertably supported into the hollow association shaft 8 in relation of being movable longitudinally of the reel body 1.

The association shaft 8 also projects at both axial ends thereof from both axial ends of tubular shaft 3 respectively, and a second pinion 81 is provided at one axial end of shaft 8 entering into the reel body 1 and an engaging member of a reciprocation mechanism to be hereinafter described is provided at the other end of the same projecting outwardly of the reel body 1. Second transmitting teeth 62 are provided at one side of the outer periphery of master gear 6 and positioned radially inwardly of the first transmitting teeth 61, so that the second pinion 81 engages with the second transmitting teeth 62 to rotate the association shaft 8 following the rotation of master gear 6.

The second transmitting teeth 62 are equal in number to the first transmitting teeth 61 and smaller in pitch than the same. The second pinion 81 is larger in the number of teeth than the first pinion 31, so that the association shaft 8 rotates at lower speed than the tubular shaft 3.

The spool shaft 9 is provided at its axially intermediate portion with a traverse groove 91, at one axial end entering into the reel body 1 with a slider 10 which restrains the spool shaft 9 from rotating and allows it only to axially move, and at the other end projecting outwardly from the reel body 1 with a spool 11.

In addition, the slider 10 moves together with the spool shaft 9 and restrains the rotation thereof by use of a protuberance 10a which is provided at the lateral side of slider 10 and insertably engages with a guide groove 1g at the inner surface of side wall 1d of the reel body 1 as shown in FIG. 2.

The rotary frame 7, as shown in FIG. 1, is provided with a support plate 71 having a central boss, a cylindrical body 72 connecting with the outer periphery of support plate 71, and a pair of support arms 73 and 74 swingably carrying a bail arm 75. A cylindrical cap 76, which comprises a support plate 76b and a cylindrical portion 76a in continuation of the axially outward end of cylindrical body 72, is fixed to the rotary frame 7 through a plurality of screw bolts 77 to thereby define a inner space S enclosed by the cylindrical body 72 and cylindrical portion 76a of cap 76.

The cap 76, which is used for enclosing the space S, is not indispensable, but is effective in keeping the space S dustproof and waterproof.

The spool 11 comprises a cylindrical trunk 11a and a pair of flanges 11b and 11c, the trunk 11a having an inner diameter larger than an outer diameter of cylindrical body 72 at the rotary frame 7 and being sleeved onto the cylindrical body 72 as shown in FIG. 1.

The trunk 11a has at its axially fore end a support plate 11d having at the center a boss fitted onto the axial end of spool shaft 9. A dragging thumb nut 12 is screwed with the axial end to support the boss so that the spool 11 is subjected to a given rotational resistance through a friction plate 13.

In addition, in FIGS. 1 and 2, reference number 14 designates a lock nut for fixing the rotary frame 7 to the tubular shaft 3; 15 designates a holder for the friction plate 13; 16 designates a support wall which supports the end of association shaft 8 entering into the reel body 1 and is integral with the side wall 1d thereof, 20 designates an anti-reverse rotation gear supporting the tubular shaft 3, 21 designates an operating rod which is supported rotatably to the reel body 1 and has a knob 21a at one end and a cam 21b at the other end, 22 designates a stopper pawl which is provided between the cam 21b and the anti-reverse rotation gear 20 so as to engage therewith to restrain the reverse rotation of rotary frame 7 and disengage from the anti-reverse rotation gear 20 to allow the rotary frame 7 to rotate normally or reversely, and 23 designates a handle bar provided at the end of handle shaft 5.

The fishing reel of the invention constructed as foregoing, has a reciprocation mechanism which is assembled in the space S at the rotary frame 7 and allows the spool shaft 9 to move in reciprocation longitudinally of the reel body 1.

The reciprocation mechanism comprises the traverse groove 91 at the spool shaft 9 and an engaging member 40 engageable with the groove 91, the engaging member 40 being housed within the space S and rotatable together with the rotary frame 7.

Figure 3:
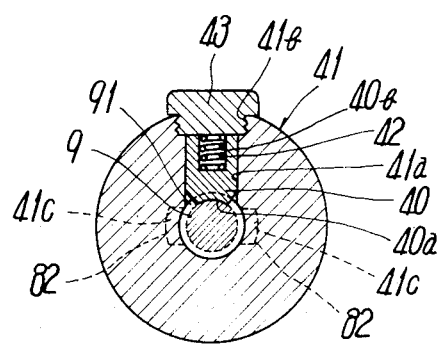
FIG. 3 is a enlarged sectional view of an engaging member.

Referring to FIG. 3, the engaging member 40 comprises a stem having at one end thereof a tapered engaging portion 40a and at the other end a recess 40b. A ring-shaped holder 41 has a bore 41a extending radially of the spool shaft 9 and a threaded bore 41b in continuation of the bore 41a. The engaging member 40 is inserted movably into the bore 41a, a cap 43 is screwed with the threaded bore 41b, and a spring 42 is inserted into the recess 40b, whereby the spring 42 biases the engaging member 40 to always engage with the traverse groove 91. In addition, the holder 41, as shown in FIG. 1, connects in association with the association shaft 8.

The holder 41 is connected to the association shaft 8 in such a manner that a plurality of protuberances 82 are provided at the edge of axial end of association shaft 8 and insertion bore 41c are provided at the holder 41, so that the protuberances 82 are fitted into the bores 41c respectively as shown in FIG. 3. A washer 45, as shown in FIG. 1, is interposed between the holder 41 and the support plate 76b at the cap 76, whereby the cap 76 fixed to the rotary frame 7 restrains the holder 41 from axially moving.

Next, the function of the fishing reel of the invention constructed as abovementioned will be described. When an angler turns the handle 23 for winding the line onto the spool 11, the rotating force of handle 23 is transmitted to the rotary frame 7 through the handle shaft 5, first transmitting teeth 61 at master gear 6, first pinion 31, and tubular shaft 3, so that the rotary frame 7 rotates and the line is guided to the trunk 11a of spool 11 through the bail arm and wound onto the trunk 11a. The rotating force also is transmitted to the engaging member 40 through the second transmitting teeth 62 at master gear 6, second pinion 81, association shaft 8, and holder 41, so that the engaging member 40 rotates while engaging with the traverse groove 91 at spool shaft 9, thereby moving the spool shaft 9 together with the spool 11 longitudinally of the reel body 1. In this instance, the line can be wound throughout onto the trunk 11a of spool 11 while changing its wound position on the trunk 11a by the aforesaid smaller pitch due to the fact that the association shaft 8, and in turn the engaging member 40, rotates through the second pinion 81 at lower speed than the rotary frame 7, thereby making it possible to wind the line uniformly onto the spool 11.

Alternatively, the engaging member 40 in the aforesaid embodiment may be connected to more in association with the tubular shaft 3 without using the association shaft 8.

In any event, the aforesaid reciprocation mechanism is assembled in the space S within the rotary frame 7, whereby the dead space formed therein is effectively usable, so that the reel body, in comparison with a conventional reel body housing the reciprocation mechanism therein is small-sized, lightweight, and inexpensive to produce.

While a preferred embodiment of the invention has been described using specific terms, such description is for illustrative purposes only, and it is to be understood that changes and variations may be made without departing from the spirit or scope of the invention which is defined in the following claims.

What is claimed is:

1. A fishing reel comprising a reel body having a front wall and side walls, a rotary frame disposed in front of the front wall of said reel body and having a first tubular shaft journalled to said reel body, a spool disposed in front of the front wall of said reel body and having at the center a spool shaft which passes through said first tubular shaft; a handle supported to one of said side walls at said reel body; a transmission mechanism for transmitting rotation of said handle to said rotary frame, said transmission mechanism including a master gear and first means for coupling said master gear to said first tubular shaft; and a reciprocation mechanism for moving said spool shaft in reciprocation longitudinally of said reel body; said rotary frame having a support plate, a cylindrical body, and a pair of support arms, said cylindrical body having therein an inner space; said reciprocation mechanism comprising a traverse groove provided at the outer periphery of said spool shaft and a second tubular shaft disposed between said spool shaft and first tubular shaft, and second means for coupling said second tubular shaft to said master gear, said first means for coupling said first tubular shaft to said master gear being separate from said second means for coupling said second tubular shaft to said master gear, said second tubular shaft having an edge extending outwardly from said front wall into said inner space, said edge being connected to an engaging member engageable with said traverse groove, said engaging member being disposed within said inner space, being fixed against axial movement along said spool shaft, and rotating together with said rotary frame upon rotation of said handle.

2. A fishing reel according to claim 1, wherein said spool has a cylindrical trunk and a pair of flanges, said trunk having an inner diameter larger than an outer diameter of said cylindrical body at said rotary frame and surrounding said cylindrical body of said rotary frame radially outwardly of said cylindrical body.

3. A fishing reel according to claim 1 or 2, wherein said rotary frame has a cap substantially equal in diameter to said cylindrical body, said cap closing said inner space.

4. A fishing reel according to claim 1, wherein said engaging member has a holder, said holder being supported to said spool shaft and connected to rotate upon rotation of said second tubular shaft by said master gear.

5. A fishing reel according to claim 1 wherein said master gear has first and second sets of transmitting teeth arranged on different diameters from a center of said master gear and said first and second tubular shafts have respective first and second pinions which respectively engage with said first and second sets of transmitting teeth, said first set of teeth and first pinion forming said first coupling means, said second set of teeth and second pinion forming said second coupling means.

6. A fishing reel according to claim 5, wherein said second set of transmitting teeth of said master gear is disposed at a position smaller in diameter than said first set of transmitting teeth.

7. A fishing reel according to claim 6, wherein said second set of transmitting teeth have a tooth pitch smaller than that of said first set of transmitting teeth, and said second pinion engaging with said second transmitting teeth, has teeth larger in number than those of said first pinion engaging with said first transmitting teeth, so that said second tubular shaft rotates at lower speed than said first tubular shaft.

* * * * *